Oct. 24, 1967 A. LUNA ET AL 3,349,343

WIDE BAND FREQUENCY MODULATOR, OF THE SOLID STATE TYPE, WITH LINEAR CHARACTERISTICS

Filed Nov. 2, 1964

INVENTORS
AGOSTINO LUNA
ROBERTO CAFISSI
BY C. A. Gulbrandsen
ATTY.

3,349,343
Patented Oct. 24, 1967

3,349,343

WIDE BAND FREQUENCY MODULATOR, OF THE SOLID STATE TYPE, WITH LINEAR CHARACTERISTICS

Agostino Luna and Roberto Cafissi, Milan, Italy, assignors to Automatic Electric Laboratories, Inc., Northlake, Ill., a corporation of Delaware Filed Nov. 2, 1964, Ser. No. 407,964
Claims priority, application Italy, Dec. 17, 1963, 42,061/63
1 Claim. (Cl. 332—14)

ABSTRACT OF THE DISCLOSURE

An emitter- coupled multivibrator has a pair of normally constant current sources connected across the emitter coupling capacitor to provide linear charging and discharging thereof, the output of one of the normally constant current sources being variable in response to an input modulating signal. Linearity of the output signal is improved by the provision of a diode-resistor linearizing network in the collector circuit of one of the multivibrator transistors.

The present invention relates to a wide band frequency modulator, of the solid state type, particularly suitable for radio links of large capacity.

It is known, that among the qualities that a wide band frequency modulator for radio links should possess, is that of presenting a modulation characteristic as nearly linear as possible.

In the traditional modulators, made with tubes, the modulated central frequency desired (normally 70 megacycles) is obtained through the beating of two klystron oscillators, of which only one is directly modulated by varying the voltage of the repeller, while the other, called the beater, by the intermediary of a converter, furnishes the desired frequency band. The desired linearity of the modulation characteristic of the modulated oscillator is obtained by loading the said oscillator with a special compensation bipole.

There are also known modulators of the solid state type employing oscillators made with transistors and "varactor" diodes used as a variable capacity. These modulators however, do not lend themselves to high variations of frequency with a linear law, because the particular law of the variation of the capacity of varactor diodes as a function of the modulating signal does not permit it. For improving the said requirement of linearity various systems have been proposed, one of which provides for the employment of two piloted modulators connected push-pull for obtaining the beat frequency therefrom. It goes without saying in this case that if, on the one hand, it would facilitate the use of high frequencies for the two modulators, for the purpose of obtaining the desired linear frequency variation with the minimum variation of the capacity of the varactor, on the other hand, the use of the high frequencies is unfavorable for the obtaining of a sufficient stability of the frequency (see for example, E. De Castro and E. Proni: "Wide Band Frequency Modulators With Varactor Diodes," in "Alta Frequenza" (High Frequency) for September 1963).

The object of the present invention is the provision of a frequency modulator of the solid state type which is very stable, and permits extensive variations of frequency in the linear mode.

According to the invention, such a modulator is realized through the employment of any multivibrator of the solid state type, suitable for high frequencies, to which a special circuit is applied having the function of linearizing the modulation characteristic. The said circuit is substituted for the resistance of the multivibrator which determines its frequency, and besides determining the said frequency, acts like an equivalent resistance which varies with the frequency of the said modulator so as to linearize the modulation characteristic.

According to a preferred form of realization, in a two-transistor multivibrator, the said linearizing circuit includes resistors and diodes which replace the load resistance of one of the transistors, which determines the frequency.

The further details and features of the invention will be described solely by way of example, with reference to the appended drawings in which:

The FIGURE 1 represents the electrical schematic of a traditional two-transistor multivibrator;

Figure 1:
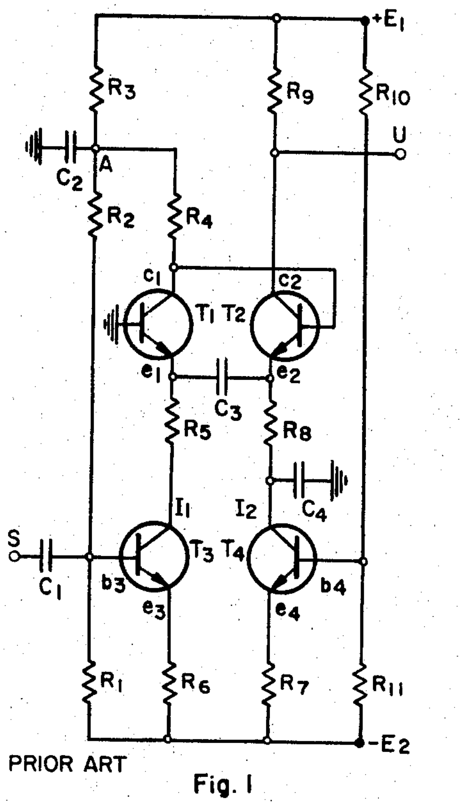
PRIOR ART Fig. 1

With reference to the FIGURE 1, the multivibrator includes essentially two transistors $T_1$ and $T_2$ fed through the respective emitters $e_1$, $e_2$ and resistors $R_5$ and $R_8$, from two current generators constituted of the transistors $T_3$ and $T_4$. The collector $c_1$ of the transistor $T_1$ is fed through the resistor $R_4$ by the potential of the point A, determined by the resistance dividers $R_1$, $R_2$, $R_3$ placed between the voltages $+E_1$ and $-E_2$.

The collector $c_2$ of the transistor $T_2$ is fed from the potential $+E_1$ through the intermediary of the resistor $R_9$.

The collector $c_1$ of $T_1$ is connected directly to the base of the transistor $T_2$, while the collector $c_2$ of the last said transistor is connected to the output terminal U.

With no input signal impressed on terminal S the output currents of the two current generators $T_3$ and $T_4$ are constant due to the similar biasing provided to these transistors by the resistor voltage divider circuits $R_1$, $R_2$, $R_3$ and $R_{10}$, $R_{11}$ between potentials $+E_1$ and $-E_2$.

The two condensers $C_2$ and $C_4$ have the function of a bypass; the condenser $C_3$ placed between the two emitters $e_1$ and $e_2$ is one of the parameters which determine the frequency, while the condenser $C_1$ uncouples, to the effect of the direct current, the input terminal S from the base $b_3$ of $T_3$.

The aforesaid circuit of the FIGURE 1 has been described in the publication "Waveforms," M.I.T. Radiation Laboratory Series of 1949, page 172, and subsequently illustrated as a transistor multivibrator in the "Proceedings of the Institution of Electrical Engineers," volume 106, Part B.

The operation of the multivibrator, as is known, is based on the alternation of the blocking and conductive phase in the two transistors $T_1$ and $T_2$, and on the resultant linear charge and discharge of the condenser $C_3$ placed between the emitters $e_1$ and $e_2$ of the transistors $T_1$ and $T_2$. The said charge and discharge is linear because the two emitters $e_1$ and $e_2$ are fed by a constant current.

Disregarding the voltage drop between the base and the emitter, assuming the current gain $\alpha$ of the transistors to be unity, and supposing the leakage currents negligible, it is easy to derive the expression of the oscillation frequency given by:

$$f=\frac{I_1I_2}{C_3R_4(I_1+I_2)^2} \qquad (1)$$

in which $I_1$ and $I_2$ are the currents of the two transistors $T_1$ and $T_2$ and $R_4$ is the load resistance of the transistor $T_1$, which is the only resistance of the circuit which determines the frequency.

According to the invention, to obtain the desired linearity, there is provided in the place of the resistor $R_4$ of the FIGURE 1, a linearization circuit which is equivalent to a resistance which diminishes in appropriate mode with increases in the current $I_1+I_2$ which traverses the transistor $T_1$.

Figure 3:
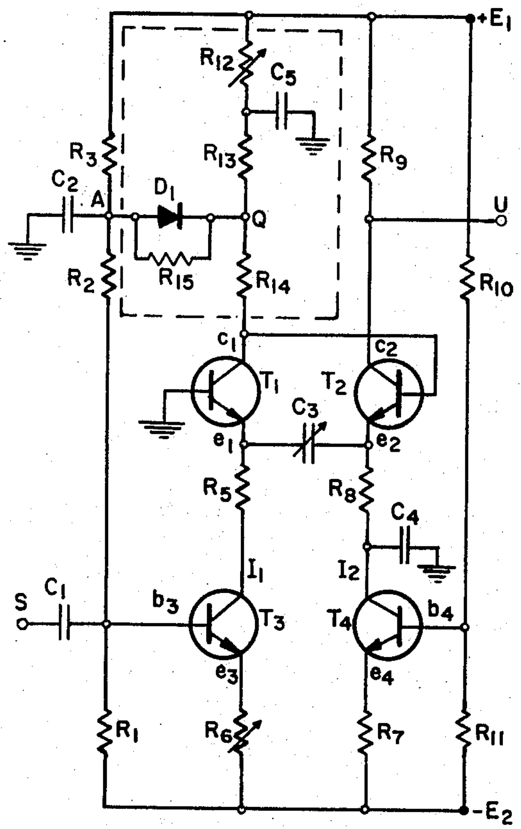
FIGURE 3 represents the schematic of the multivibrator of the FIGURE 1 equipped with the linearizing circuit according to the invention.
Figure 2:
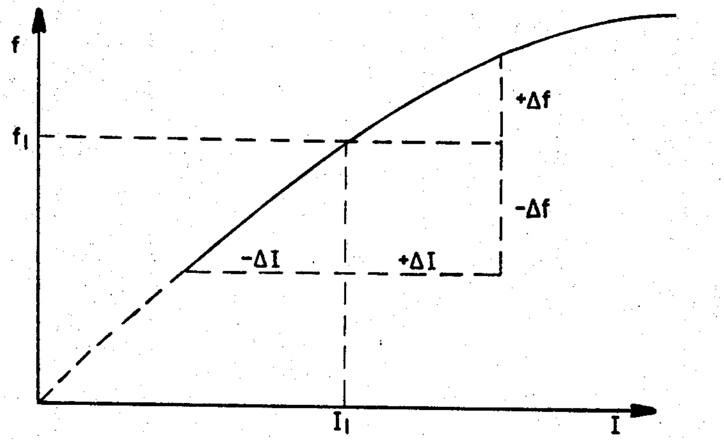
FIGURE 2 shows the behavior of the variation of the frequency as a function of the current of one of the two transistors of the said multivibrator.

Such a circuit, which is delimited in the FIGURE 3 by the broken lines, is constituted, starting from the collector $C_1$ of $T_1$, of a resistor $R_{14}$ in series with a diode $D_1$ having the anode connected to the point A. Between the point $+E_1$ and the junction point Q of $R_{14}$ and $D_1$, are placed two series resistors $R_{12}$ and $R_{13}$ which, together with a resistor $R_{15}$, placed in parallel with $D_1$, form a voltage divider which defines the potential of the point Q. The said potential is such that the diode is conductive when the transistor $T_1$ is conductive, and is blocked when $T_1$ is blocked.

In this way, the sudden voltage rise which appears on the collector $C_1$ of $T_1$, when the current of this transistor passes from zero to $I_1+I_2$, is limited and defined by the difference of potential which is established between the point A and the point Q under the condition of $T_1$ blocked. To vary the sudden rise in the voltage, the direct current of the divider is adjusted by the variation of $R_{12}$, which is then uncoupled from the rest of the circuit by means of the bypass condenser $C_5$.

From the theoretical point of view and with the simplifications introduced for obtaining the expression (1) for the frequency, ignoring therefore various secondary phenomena such as parasitic capacity, et cetera, which considerably alter the wave form, the sole diminution of $R_4$ (of FIGURE 1) as a result of the variation of the current $(I_1+I_1)$ is not sufficient for obtaining the desired linearity. Actually, calling $\Delta V$ the voltage jump of the collector $c_1$ which occurs when the current of the transistor $T_1$ passes from zero to $(I_1+I_2)$, the expression for the frequency may also be written in the following manner:

$$f=\frac{I_1I_2}{C_3\Delta V(I_1+I_2)} \qquad (2)$$

From (2) it is seen that by varying $I_1$, the frequency does not vary linearly, either because $(I_1+I_2)$ varies, or because $\Delta V=R_4(I_1+I_2)$ varies. By using a diode, placed on the collector of the transistor $T_1$, all that can be obtained, in the case of an ideal diode, is to make $\Delta V$ constant on variations of the current $I_1$, which is equivalent to a diminution of $R_4$ when $I_1$ increases. On the other hand, with the term $(I_1+I_2)$ remaining in the formula (2), a perfect linearity is not yet reached. In practice on the contrary, since there are other phenomena associated with the alteration of the wave form, the aggregate linearity is better than the theoretical, and the expedient of maintaining $\Delta V$ constant by means of a diode, is clearly excessive. It is sufficient therefore, to produce a less brusk voltage jump $\Delta V$, which condition is precisely satisfied by the linearization circuit according to the invention as above described. The circuit also presents the advantage of permitting, through the intermediary of $R_{12}$, a regulation of the movement of the said voltage jump $\Delta V$. In conclusion, in a circuit such as that indicated in the FIGURE 3, there is the possibility of regulating the linearity and the central frequency through the regulation of $R_{12}$, $C_3$ and $R_6$, to obtain a frequency modulator with excellent qualities of linearity.

By way of example, in a realization according to the schematic of the FIGURE 3, and with the following values of the various parameters:

| | | Ohms |
|---|---|---|
| $R_1$ | | 800 |
| $R_2$ | | 1700 |
| $R_3$ | | 700 |
| $R_5$ | | 1000 |
| $R_6$ | | 0–2000 |
| $R_7$ | | 600 |
| $R_8$ | | 400 |
| $R_9$ | | 50 |
| $R_{10}$ | | 2400 |
| $R_{11}$ | | 800 |
| $R_{12}$ | | 0–3000 |
| $R_{13}$ | | 1200 |
| $R_{14}$ | | 62 |
| $R_{15}$ | | 1000 |
| $C_1$ | microfarads | 0.1 |
| $C_2$ | do | 0.1 |
| $C_3$ | picofarads | 5.5–18 |
| $C_4$ | microfarads | 0.1 |
| $C_5$ | do | 0.1 |
| $+E_1$ | volts | +12 |
| $-E_2$ | do | −20 |

the following results may be obtained:

Central frequency $f_c$=70 megacycles;
Modulating frequency band >20 megacycles;
Spread of linearity measured over an interval $\Delta f_c=\pm 10$ megacycles=0.3 percent;
Thermal noise in the worst channel (in the case of 960 simulated telephone channels with white noise and assuming an effective frequency deviation per channel of 200 kilocycles)=14 picowatts;
Modulation sensitivity=7 megacycles/volt.

What is claimed is:

A frequency modulator comprising: an astable multivibrator including first and second alternately conducting transistors, each said transistor having a base, an emitter and a collector, and a capacitor connected between said emitters, the frequency of oscillation being dependent on the valves of said capacitance, the emitter current of said first transistor, and the voltage change at the collector of said first transistor when it passes from a nonconducting to a conducting condition, first and second current generators respectively connected to said two emitters to provide linear charging and discharging of said capacitance, said first current generator including an input terminal for receiving a modulating signal, the output current of said first current generator being dependent on the amplitude of said modulating signal, an output terminal connected to the collector of said second transistor, a source of direct current potentials coupled to said first and second current generators and to said two collectors, and a voltage divider linearizing network connected between said source of direct current potentials and the collector of said first transistor, said linearizing network including a diode connected in a shunt between said source and said first transistor, a resistor connected directly across said diode, a variable resistor in series between said source and said first transistor and a second capacitor shunted to ground between said variable resistor and said diode, said diode being poled to be non-conductive when said first transistor is non-conductive and conductive when said first transistor is conductive to maintain said voltage change constant.

References Cited

UNITED STATES PATENTS

| | | | |
|---|---|---|---|
| 3,058,069 | 10/1962 | Sun | 331—113 |
| 3,152,306 | 10/1964 | Cooper et al. | 331—113 |
| 3,178,658 | 4/1965 | Henrion | 332—14 |
| 3,061,799 | 10/1962 | Biard | 332—14 |

ALFRED L. BRODY, *Primary Examiner.*